US012421022B2

(12) United States Patent
Kitagawa

(10) Patent No.: US 12,421,022 B2
(45) Date of Patent: Sep. 23, 2025

(54) TANK MOUNTING STRUCTURE

(71) Applicant: TOYOTA JIDOSHA KABUSHIKI KAISHA, Toyota (JP)

(72) Inventor: Kazuki Kitagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 18/533,773

(22) Filed: Dec. 8, 2023

(65) Prior Publication Data

US 2024/0262612 A1 Aug. 8, 2024

(30) Foreign Application Priority Data

Feb. 2, 2023 (JP) ................................ 2023-014514

(51) Int. Cl.
*F17C 13/08* (2006.01)
*B65D 88/12* (2006.01)
*B65D 90/20* (2006.01)

(52) U.S. Cl.
CPC ........... *B65D 88/128* (2013.01); *B65D 90/20* (2013.01); *F17C 13/083* (2013.01); *F17C 2201/0104* (2013.01); *F17C 2201/035* (2013.01); *F17C 2205/0103* (2013.01); *F17C 2221/012* (2013.01); *F17C 2270/0171* (2013.01); *F17C 2270/0184* (2013.01)

(58) Field of Classification Search
CPC .......... F17C 2205/01; F17C 2205/0103; F17C 2205/0107; F17C 2205/0153; F17C 2205/0157; F17C 2205/0192; F17C 13/08; F17C 13/083; F17C 13/084; F17C 13/085; B65D 88/128; B65D 88/129; B65D 88/14
See application file for complete search history.

(56) References Cited

U.S. PATENT DOCUMENTS 4,555,083 A * 11/1985 Carter ........................ B60P 7/12
224/403
6,536,722 B2 * 3/2003 Sadowski ............. F17C 13/084
248/154
10,670,191 B2 * 6/2020 Yeggy .................... F17C 13/083
2003/0006349 A1 * 1/2003 Sadowski ............. F17C 13/084
248/154
2010/0018591 A1 * 1/2010 Jauss ...................... B60K 15/07
137/376
2013/0334269 A1 * 12/2013 Cardonna .............. B60N 3/106
224/570
2019/0226641 A1 * 7/2019 Ogiwara ................. F17C 13/12
2021/0268897 A1 * 9/2021 Mair ....................... G01G 19/08
2022/0048380 A1 * 2/2022 Yordanov ................. F17C 1/06
2022/0082212 A1 * 3/2022 Woo ........................ F16M 11/22
(Continued)

FOREIGN PATENT DOCUMENTS

JP 2010001095 A * 1/2010
JP 2017-206042 A 11/2017

*Primary Examiner* — Don M Anderson
(74) *Attorney, Agent, or Firm* — SoraIP, Inc.

(57) ABSTRACT

A tank mounting structure includes a tank, a frame for mounting the tank, and a neck mount for holding the tank, the neck mount having projecting portions at both ends in the width direction, the frame having a bracket for fixing the neck mount, the bracket having a hook-shaped portion covering the projecting portion, and the neck mount being secured to the bracket with the projecting portion sandwiched between the hook-shaped portions.

15 Claims, 2 Drawing Sheets

(56) References Cited

U.S. PATENT DOCUMENTS

| | | | | |
|---|---|---|---|---|
| 2022/0203826 | A1* | 6/2022 | Fujii | B60K 15/067 |
| 2024/0191843 | A1* | 6/2024 | Baer | F17C 13/084 |
| 2024/0247763 | A1* | 7/2024 | Sako | F17C 13/08 |

* cited by examiner

TANK MOUNTING STRUCTURE

CROSS-REFERENCE TO RELATED APPLICATION

This application claims priority to Japanese Patent Application No. 2023-014514 filed on Feb. 2, 2023, incorporated herein by reference in its entirety.

BACKGROUND

1. Technical Field

The present application relates to a tank mounting structure.

2. Description of Related Art

A tank filled with high-pressure hydrogen gas or the like is mounted on a predetermined frame and transported. A tank fixing structure using a neck mount disclosed in Japanese Unexamined Patent Application Publication No. 2017-206042 (JP 2017-206042 A), for example, is known as a tank fixing structure in a frame.

SUMMARY

A neck mount that supports a tank usually has projecting portions that project in the width direction at both ends thereof. The neck mount is placed on a bracket of the frame, and fixed by inserting fixing members such as bolts vertically into the projecting portions.

When a large tank is placed on the neck mount using a conventional fixing method and the tank mounting structure is transported using a moving unit such as a truck, the fixing members may be loosened. While the loosening of the fixing members can be resolved by increasing the number of fixing members that fix the projecting portions and firmly fixing the fixing members, this requires increasing the size of the projecting portions, which may lead to an increase in weight.

Therefore, a main object of the present disclosure is to provide a tank mounting structure capable of suppressing an increase in weight while securing safety.

The present disclosure provides at least the following aspects.

A first aspect provides a tank mounting structure including:

- a tank;
- a frame on which the tank is mounted; and
- a neck mount that holds the tank, in which:
- the neck mount has projecting portions at both ends in a width direction;
- the frame has a bracket for fixation of the neck mount;
- the bracket has hook-shaped portions that cover the projecting portions; and
- the neck mount is fixed to the bracket with the projecting portions sandwiched between the hook-shaped portions.

A second aspect provides the tank mounting structure according to the first aspect, in which a center of the neck mount is located closer to the frame than an axial center of the tank.

A third aspect provides the tank mounting structure according to the first or second aspect, in which the neck mount holds the tank so as to be axially slidable.

According to the tank mounting structure of the present disclosure, an increase in weight can be suppressed while securing safety.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The tank mounting structure of the present disclosure will be described using a tank mounting structure 100, which is one embodiment.

Figure 1:
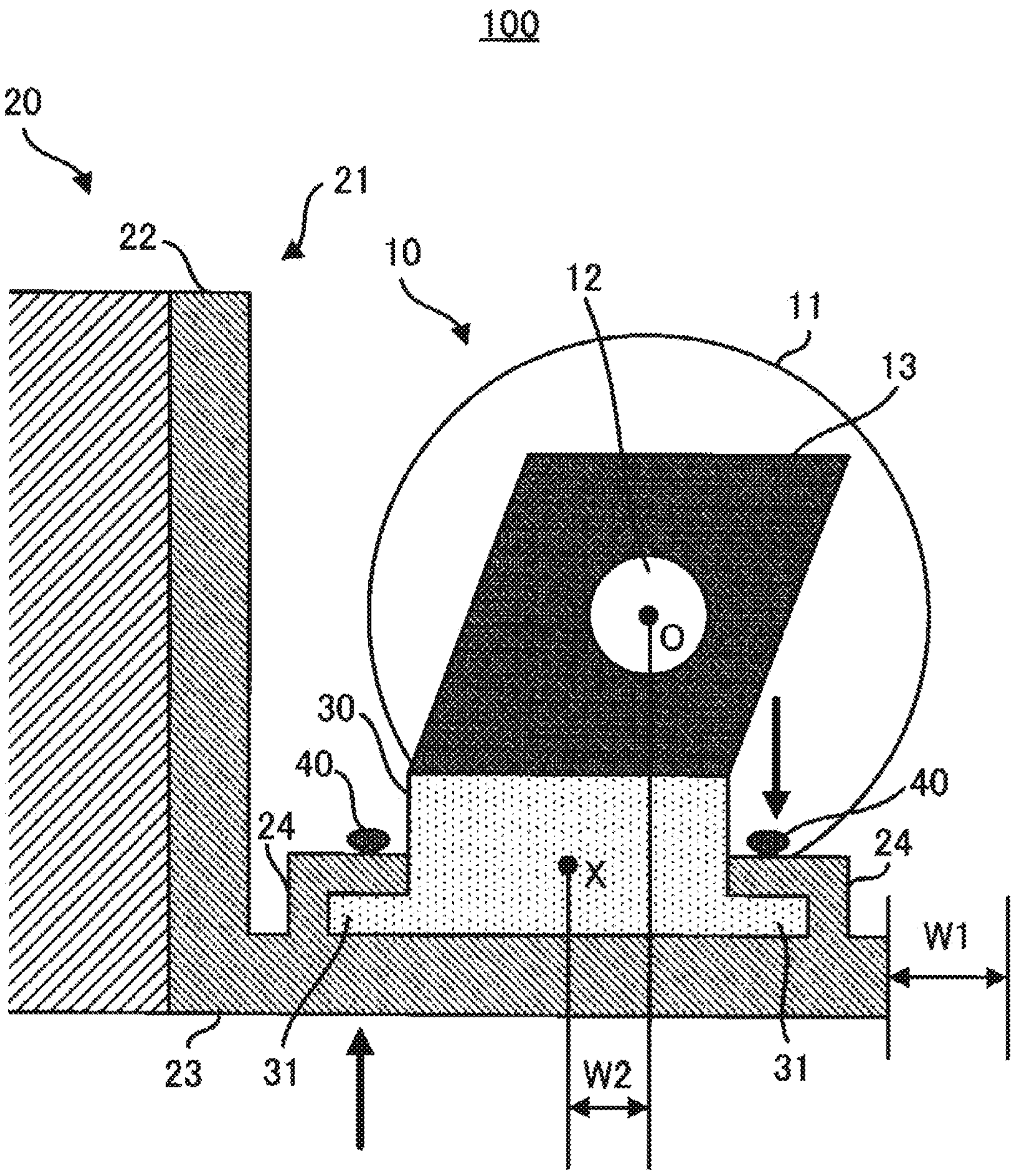
FIG. 1 is a schematic view of a tank mounting structure 100 viewed from the front.

FIG. 1 shows a schematic view of a tank mounting structure 100 viewed from the front. As shown in FIG. 1, the tank mounting structure 100 includes a tank 10, a frame 20 for mounting the tank 10, and a neck mount 30 holding the tank 10. Hereinafter, the width direction of the tank 10 may be simply referred to as the width direction (horizontal direction in FIG. 1), and the central axis direction of the tank 10 may simply be referred to as the axial direction (backward direction in FIG. 1). Note that the vertical direction in FIG. 1 is the vertical direction.

Tank 10

The tank 10 is a high-pressure gas tank that can be filled with gas at high pressure. The type of gas is not particularly limited. Examples thereof include fuel gas (hydrogen, reformed gas, etc.) used in fuel cell.

The tank 10 includes a tank body 11 having a hollow cylindrical shape, necks 12 arranged at both ends in the axial direction of the tank body 11, and neck blocks 13 arranged at the necks 12.

The tank body 11 is a container filled with gas. A cylindrical trunk portion of the tank body 11 has the largest outer diameter and extends in the axial direction. The shoulder portion is a portion that connects the body portion and the neck 12, and is formed so that the outer diameter becomes smaller toward the outside in the axial direction.

The neck 12 is a cylindrical member having an outer diameter smaller than that of the barrel. The neck 12 has a communication hole that communicates with the inside of the tank body 11. A predetermined lid is arranged at the opening of the communication hole. The tank body 11 can be hermetically sealed by fixing the lid to the neck 12.

The neck block 13 is attached to the neck 12 and is a member for connecting with a neck mount 30 which will be described later. The neck block 13 has an opening surrounding the outer circumference of the neck 12. Also, the lower end of the neck block 13 has a fastening portion for fastening to the neck mount 30. The neck block 13 has a rhombic shape when viewed from the front, and the lower side is closer to the frame 20 side than the upper side. However, the shape of the neck block 13 is not limited to this, and may be any shape as long as it can be attached to the neck 12 while being fastened to the neck mount 30.

The tank 10 is manufactured, for example, as follows. First, the surface of a liner having a hollow cylindrical shape is covered with a fiber layer to form a tank intermediate. Next, the neck 12 is placed on the small-diameter end of the intermediate tank body, and the tank body 11 is sealed with a lid. Then, the tank 10 is manufactured by attaching the neck block 13 to the neck 12. The liner is made of a resin material such as nylon. The fiber layer is made of fiber-reinforced resin such as carbon fiber. Generally, a fiber layer is formed by weaving a fiber bundle formed by bundling a plurality of fiber-reinforced resins on the surface of the liner. The fiber layer can be formed using, for example, a braiding method.

Here, one of the necks 12 arranged at both ends of the tank 10 may be fixed to the neck block 13 and the other neck 12 may not be fixed. This allows the neck 12 which is not fixed to slide axially inside the opening of the neck block 13. The tank 10 is expanded/contracted by gas filling/discharging. Therefore, the tank 10 may be held such that one end is fixed and the other end is movable so as to accommodate such shape changes of the tank 10.

Frame 20

A plurality of tanks 10 can be mounted on the frame 20. The frame 20 is a frame member having a rectangular shape, and pillars are arranged on each side. Frame 20 shown in FIG. 1 is a portion thereof. Since the configuration of the frame 20 is well known, detailed description thereof is omitted here.

Frame 20 has a bracket 21 for fixing neck mount 30. In FIG. 1, an L-shaped bracket 21 is used. However, the shape of the bracket 21 is not limited to this. Bracket 21 may be, for example, an I-shaped bracket.

Bracket 21 has a vertical portion 22 and a horizontal portion 23. The vertical portion 22 is a member that extends vertically and is fixed to the pillar of the frame 20. The horizontal portion 23 is a member extending in the width direction and supports the neck mount 30. The horizontal portion 23 also has two hook-shaped portions 24. The hook-shaped portions 24 extend axially and are arranged so that their openings face each other. The neck mount 30 is arranged on the bracket 21 by sliding the neck mount 30 axially along the opening.

Neck Mount 30

A neck mount 30 rests on the horizontal portion 23 of the bracket 21 and supports the tank 10. The neck mount 30 has a fastening portion at its upper portion, and the fastening portion of the neck block 13 is connected to the fastening portion of the neck mount 30. As a result, the neck mount 30 and the neck block 13 are fastened together, and the tank 10 is supported by the neck mount 30.

The neck mount 30 has projecting portions 31 at both ends in the width direction. The projecting portion 31 is a plate-like member extending in the axial direction, and protrudes outward in the width direction. The projecting portion 31 is arranged inside the hook-shaped portion 24, and the upper surface and the lower surface thereof are covered with the hook-shaped portion 24. The neck mount 30 is fixed to the bracket 21 with the projecting portion 31 sandwiched between the hook-shaped portions 24. Specifically, a fixing member 40 such as a bolt is used from the vertical direction to fix the projecting portion 31 and the hook-shaped portion 24. In this way, the projecting portion 31 is fixed while being sandwiched (contacted) between the hook-shaped portions 24, thereby increasing the frictional force between the projecting portion 31 and the hook-shaped portion 24. The improvement of the frictional force will be described later.

Here, the neck mount 30 may hold the tank 10 slidably in the axial direction. As described above, one of the necks 12 arranged at both ends of the tank 10 may be fixed to the neck block 13 and the other neck 12 may not be fixed. This allows the neck 12 which is not fixed to slide axially inside the opening of the neck block 13. Therefore, when the neck mount 30 is fastened to the neck block 13 fixed to the neck 12, the neck mount 30 holds the tank 10 in a fixed position. When the neck mount 30 is fastened to the neck block 13 which is not fixed to the neck 12, the neck mount 30 holds the tank 10 slidably in the axial direction.

Effect

Increased Frictional Force

Figure 2:
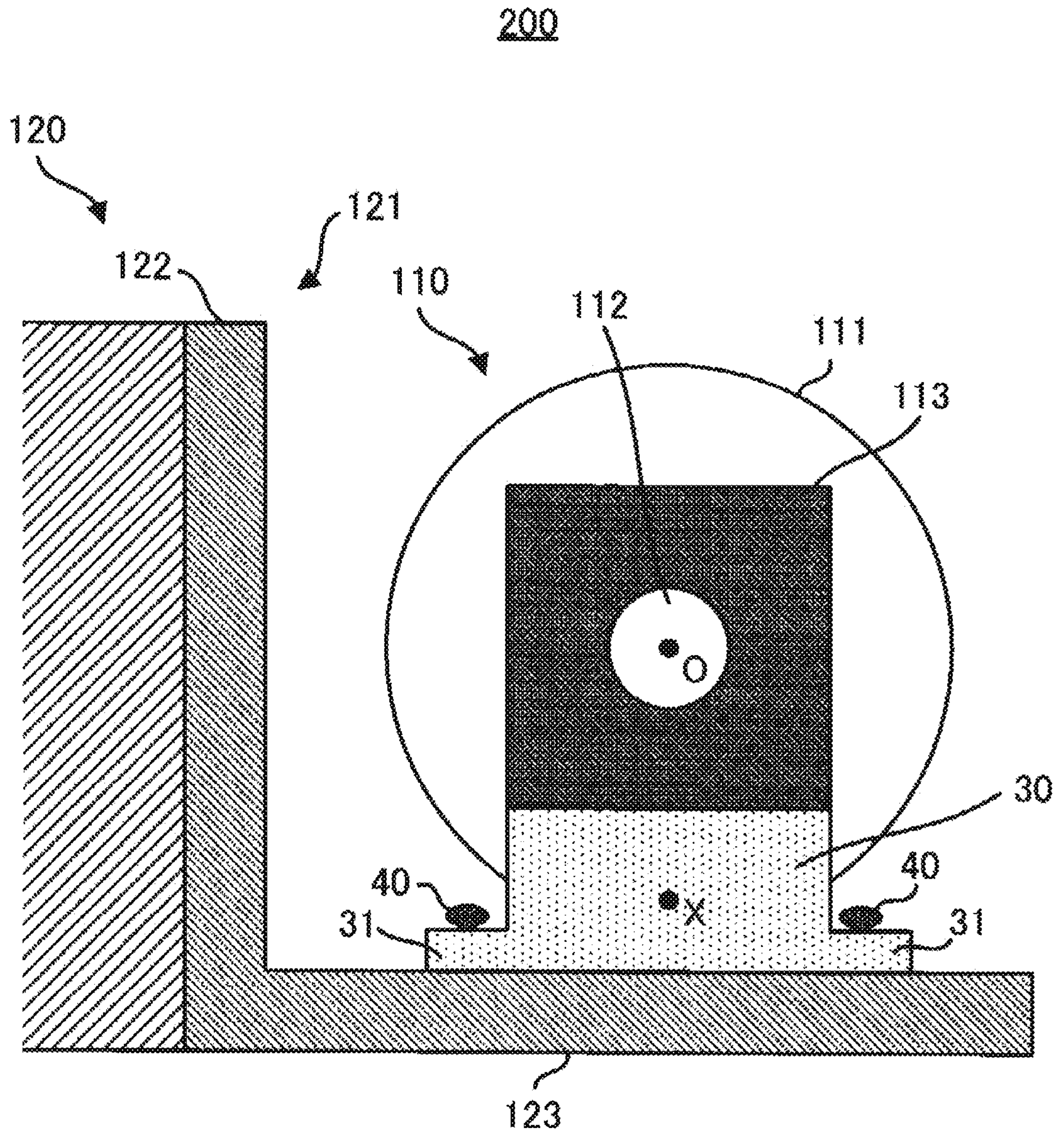
FIG. 2 is a schematic view of the tank mounting structure 200 viewed from the front.

FIG. 2 shows a schematic view of the tank mounting structure 200 viewed from the front. The tank mounting structure 200 has a configuration in which the hook-shaped portion 24 is removed from the tank mounting structure 100. As shown in FIG. 2, in tank mounting structure 200, projecting portion 31 of neck mount 30 is secured to horizontal portion 123 of bracket 121 using securing member 40. Since the horizontal portion 123 does not have a hook-shaped portion, only the lower surface of the projecting portion 31 contacts the horizontal portion 123. On the other hand, in the tank mounting structure 100, as shown in FIG. 1, the projecting portion 31 is fixed to the horizontal portion 23 while being sandwiched between the hook-shaped portions 24. Accordingly, the upper and lower surfaces of the projecting portion 31 come into contact with the hook-shaped portion 24.

Thus, in the tank mounting structure 200, the contact surface between the projecting portion 31 and the bracket 121 is one surface, whereas in the tank mounting structure 100, the contact surface between the projecting portion 31 and the bracket 21 is two surfaces. Therefore, the tank mounting structure 100 has an increased frictional force between the projecting portion 31 and the hook-shaped portion 24 (horizontal portion 23) as compared with the tank mounting structure 200. The increase in frictional force suppresses the neck mount 30 from slipping when the tank mounting structure 100 is transported by a moving means such as a truck, and thus the fixing member 40 is also suppressed from loosening. Therefore, according to the tank mounting structure 100, a sufficient safety factor can be ensured without increasing the number of fixing members. Moreover, since there is no need to increase the number of fixing members, the projecting portion 31 does not have to be formed large. Therefore, according to the tank mounting structure 100, it is possible to suppress an increase in weight for ensuring safety.

Improved Load Capacity

As described above, the hook-shaped portion 24 covers the projecting portion 31. Therefore, the neck mount 30 has improved load resistance against upward input. In FIG. 1, the vertical portion 21 arranged on the left side is fixed to the frame 20. Thus, a downward moment is applied to the projecting portion 31 located on the right side, and an upward moment is applied to the projecting portion 31 located on the left side (arrow in FIG. 1). In this way, when an upward moment is applied to the neck mount 30, the provision of the hook-shaped portion 24 allows the upper surface of the hook-shaped portion 24 to act as a stopper, thereby improving load resistance.

Reduction of the Moment Applied to the Fixed Part of the Frame 20 and the Bracket 21

As described above, the tank mounting structure 100 is provided with the hook-shaped portion 24 to improve load resistance against an upward moment. Using this effect, the length of the horizontal portion 23 can be shortened.

When FIGS. 1 and 2 are compared, the length of the horizontal portion 23 is shorter than the length of the horizontal portion 123 by the length indicated by W1 in FIG. 1. When the tank 10 is mounted on the frame 20, it may be difficult to change the position of the tank 10. Therefore, in FIGS. 1 and 2, the tanks 10 are arranged at the same position. On the other hand, the position of neck mount 30 can be changed. Therefore, only the neck mount 30 is moved to the frame 20 side in FIG. 1. Here, the rectangular neck block 113 is used in the tank mounting structure 200, but it cannot be used as it is in the tank mounting structure 100. Therefore, the tank mounting structure 100 uses a diamond-shaped neck block 13. Therefore, the center X of the neck mount 30 is located closer to the frame 20 than the axial center O of the tank. The center X of the neck mount 30 is the intersection of straight lines that bisect the length in the width direction and the length in the vertical direction of the neck mount 30 when viewed from the front. For example, the length W2 of the width direction component between the center X and the center O may be in the range of more than 0 mm and 15 mm or less, and may be in the range of 5 mm or more and 15 mm or less.

In this way, when the center X of the neck mount 30 is positioned closer to the frame 20 than the axial center O of the tank, the load of the tank 10 applies a larger upper moment to the left projecting portion 31 than in FIG. 2. However, as described above, the tank mounting structure 100 includes the hook-shaped portions 24 to accommodate such increased moments.

Here, focusing on the fixed portion between the frame 20 and the bracket 21 (vertical portion 22), the shorter the horizontal portion 23, the smaller the moment applied to the fixed portion. This makes it easier to hold the fixing portion. Focusing on the joint between the vertical portion 22 and the horizontal portion 23, the moment applied to the joint becomes small. This makes it possible to widen the selection of materials for the bracket and to apply a lightweight bracket.

An embodiment has been used to describe the tank mounting structure of the present disclosure. According to the tank mounting structure of the present disclosure, an increase in weight can be suppressed while ensuring safety.

Hereinafter, the tank mounting structure of the present disclosure will be further described using examples.

Following FIGS. 1 and 2, tank mounting structures of Example and Comparative Examples 1 and 2 were constructed. An example is a test example having a hook-shaped portion. In the example, four bolts were used to fix one projecting portion. Comparative Examples 1 and 2 are test examples that do not have a hook-shaped portion. In Comparative Example 1, four bolts were used to fix one projecting portion. In Comparative Example 2, six bolts were used to fix one projecting portion.

A safety factor was calculated based on the conditions in Table 1 for Example and Comparative Examples 1 and 2. When the safety factor was less than 1, it was evaluated as "x", and when it was 1 or more, it was evaluated as "o".

Here, each item in Table 1 will be explained. "Axial force" means the axial force of the bolt that secures the projecting portion. "Frictional force between mating surfaces" means the frictional force between the projecting portion and the horizontal portion; Since Comparative Examples 1 and 2 do not have a hook-shaped portion, it means the inter-surface frictional force between the horizontal portion and the lower surface of the projecting portion. Since Example 1 has a hook-shaped portion, the hook-shaped portion contacts the upper and lower surfaces of the projecting portion. Therefore, in Example 1, the total value of the inter-surface frictional forces between the hook-shaped portion and the upper and lower surfaces of the projecting portion is used. The "safety factor" means a factor determined by the ratio of the standard strength of the material to the allowable stress, and indicates how much margin there is with respect to the applied load. Axial force, joint friction force and safety factor are calculated using predetermined simulation software. Conditions for calculating the safety factor include the number of bolts, axial force, frictional force between connecting surfaces, and the like.

TABLE 1

| | Presence or absence of hook-shaped portion | number of bolts | Axial force (kN) | Friction force between joint surfaces (kN) | safety ratio | evaluation |
|---|---|---|---|---|---|---|
| Comparative example 1 | Nothing | 4 | 89.5 | 22.3882 | 0.725 | x |
| Comparative example 2 | Nothing | 6 | 89.5 | 22.3882 | 1.087 | ○ |
| Example | Yes | 4 | 89.5 | 44.7763 | 1.449 | ○ |

As shown in Table 1, the safety factor of the example was 1 or more and was a higher value than the comparative examples 1 and 2. It is considered that this is because the hook-shaped portion is used to increase the frictional force between the joint surfaces. When compared with Comparative Examples 1 and 2, the frictional force between the joint surfaces of the example is approximately double.

The safety factor of Comparative Example 1 was less than 1. It is considered that this is because the frictional force between the joint surfaces is reduced because the hook-shaped portion is not provided. On the other hand, the safety factor of Comparative Example 2 is 1 or more. It is considered that this is because the number of bolts was increased by 1.5 times as compared with Comparative Example 1. However, the safety factor of Comparative Example 2 was smaller than that of Example 1 even though the number of bolts was increased by 1.5 times.

What is claimed is:

1. A tank mounting structure comprising:

a tank comprising
  a tank body having a hollow cylindrical shape,
  a neck arranged at an end of the tank body in an axial direction, the neck having a cylindrical shape, and
  a neck block surrounding the neck:
a frame on which the tank is mounted; and
a neck mount configured to hold the tank such that a horizontal direction of the tank mounting structure mounted on a moving means aligns with the axial direction, wherein:
the neck mount has projecting portions at both ends in a width direction;
a center of the neck mount is laterally offset from an axis of the tank;
at least a part of the neck mount extends under the neck;

the width direction of the neck mount is wider than a diameter of the neck;

the frame has a bracket fixing the neck mount;

the bracket has hook-shaped portions that cover the projecting portions; and the neck mount is fixed to the bracket with the projecting portions sandwiched between the hook-shaped portions.

2. The tank mounting structure according to claim 1, wherein in an axial view of the tank a center of the neck mount is located closer to the frame than the axis of the tank.

3. The tank mounting structure according to claim 1, wherein the neck mount holds the tank so as to be axially slidable.

4. The tank mounting structure according to claim 1, wherein the bracket has a vertical portion and a horizontal portion, the vertical portion extends vertically, the horizontal portion extends in the width direction, and an entire bottom surface of the neck mount contacts with the horizontal portion.

5. The tank mounting structure according to claim 4, wherein in an axial view of the tank, a center of the neck mount is located closer to the vertical portion than the axis of the tank.

6. The tank mounting structure according to claim 1, wherein:

the neck block has an opening configured to surround an outer circumference of the neck;

a lower end of the neck block is configured to be fastened to the neck mount;

the neck block has a rhombic shape when viewed in the axial direction; and a lower side of the neck block is located closer to the frame than an upper side of the neck block.

7. The tank mounting structure according to claim 1, wherein in an axial view of the tank, the neck block is in a diamond shape.

8. The tank mounting structure according to claim 1, wherein a length in the width direction between an axis of the neck mount and the axis of the tank is 5 mm or more and 15 mm or less.

9. The tank mounting structure according to claim 1, wherein a length in the width direction between an axis of the neck mount and the axis of the tank is more than 0 mm and 15 mm or less.

10. The tank mounting structure according to claim 1, wherein in an axial view of the tank, the neck block is in a rhombic shape.

11. The tank mounting structure according to claim 1, wherein the bracket comprises a vertical portion and a horizontal portion, the vertical portion is fixed to a pillar of the frame, and the horizon portion supports the neck mount.

12. The tank mounting structure according to claim 1, wherein the hook-shaped portions extend in the axial direction, and are arranged so that opening of the hook-shaped portions face each other.

13. The tank mounting structure according to claim 1, wherein the tank is a high-pressure gas tank configured to be filled with fuel gas, and the fuel gas is a gas used in fuel cell, including hydrogen or reformed gas.

14. The tank mounting structure according to claim 1, wherein the projecting portion and the hook-shaped portion are fixed to each other using a bolt in the vertical direction.

15. The tank mounting structure according to claim 1, wherein the moving means is a truck.

* * * * *